United States Patent [19]
Knauft et al.

[11] 3,768,071
[45] Oct. 23, 1973

[54] COMPENSATION FOR DEFECTIVE STORAGE POSITIONS

[75] Inventors: Guenter Knauft, Boeblingen; Fritz Koederitz, Gechingen; Petar Skuin, Magstadt; Edwin Vogt, Boeblingen, all of Germany

[73] Assignee: International Business Machines Corporation, Armonk, N.Y.

[22] Filed: Jan. 24, 1972

[21] Appl. No.: 219,929

[52] U.S. Cl. ................ 340/146.1 BA, 235/153 AM
[51] Int. Cl. ............................................ G11c 29/00
[58] Field of Search .......................... 340/146.1 BA; 235/153 AM

[56] References Cited

UNITED STATES PATENTS

| | | | |
|---|---|---|---|
| 3,340,506 | 9/1967 | Mayer | 340/146.1 BA |
| 3,449,718 | 6/1969 | Woo | 340/146.1 BA |
| 3,523,279 | 8/1970 | Briley et al. | 340/146.1 BA |
| 3,582,880 | 6/1971 | Beausoleil et al. | 340/146.1 BA |
| 3,665,393 | 5/1972 | Brune et al. | 340/146.1 BA |

*Primary Examiner*—Charles E. Atkinson
*Attorney*—Thomas F. Galvin et al.

[57] ABSTRACT

In order to save in a storage the storage elements for the redundancy bits which are required when using an error correction code, the following method is employed. Apart from the storage elements for the data bits and the appertaining parity bit, only one additional storage element is provided per storage location. For error detection, a word to be stored is read immediately after having been stored. If an error is detected, the word to be stored is inverted, marked as an inverted word in the additional storage element and stored in this form. When the word is read later on, it is again inverted by virtue of the marking in the additional storage element to retrieve the original correct information supplied. If not more than one storage element is defective per storage location, error detection is carried out by means of a simple parity check. In the case of several defective storage elements the word to be stored is compared with the word read.

4 Claims, 5 Drawing Figures

COMPENSATION FOR DEFECTIVE STORAGE POSITIONS

Figure 1:
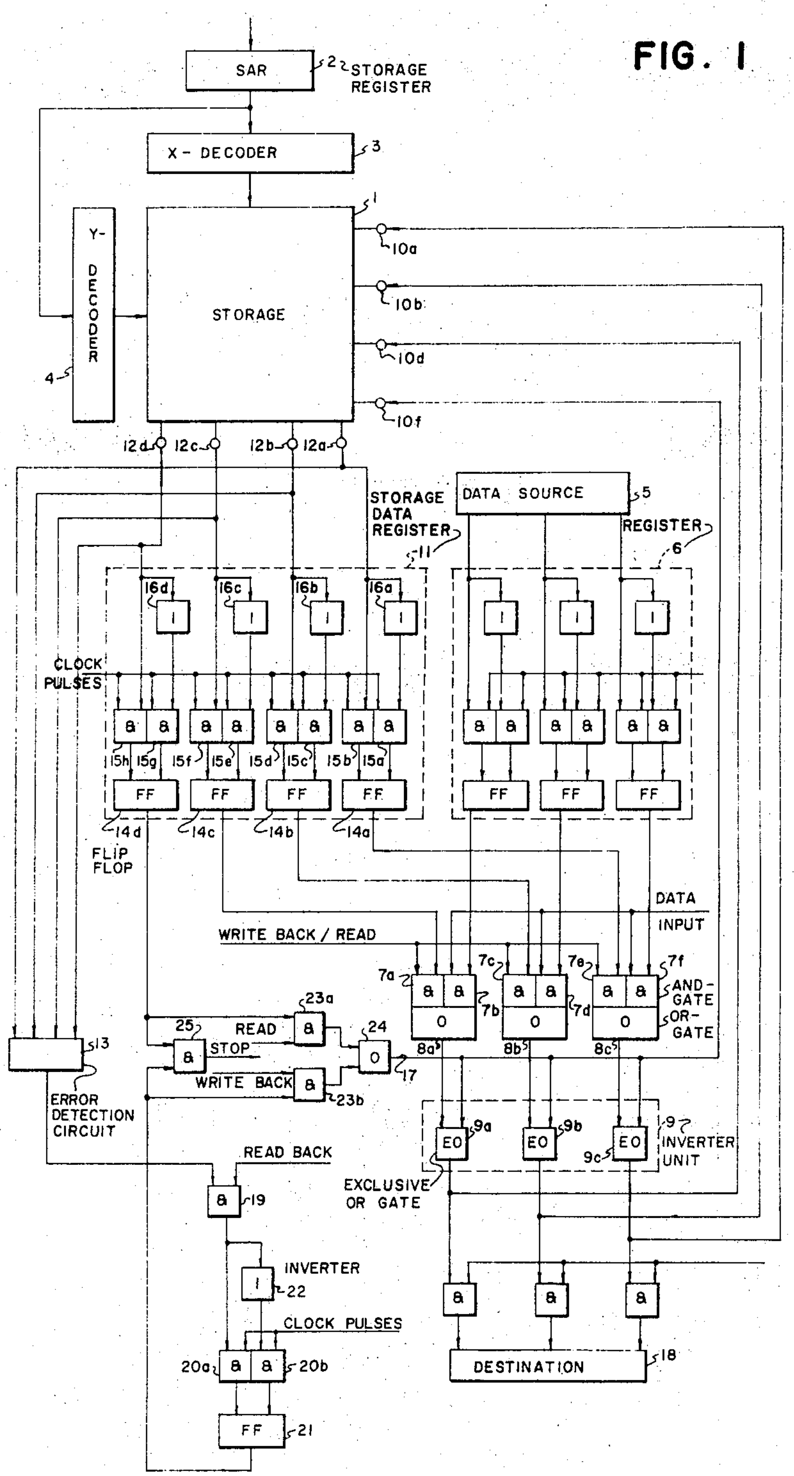

For the rapid solution of the increasingly intricate problems involved in electronic data processing it is necessary to improve the performance of program-controlled data processors. This means that their computing speed or the number of operations to be carried out per unit of time must be increased. To this end it is not sufficient to merely raise the speed of the arithmetic unit; rather it is essential to reduce the access time to the storage so that the high computing speed of the electronic arithmetic unit can be fully utilized. Storages available with short access times are those realized in monolithic design. However, the reliability of these storages falls short of that of, for example, magnetic core storages which operate at lower speeds. Therefore, it must be ensured that errors are automatically corrected. For this purpose the data to be stored are encoded in an error correction code. Encoding of the data to be stored for automatic error correction entails the addition of redundancy bits which have to be stored together with the data bits. Upon reading a word thus protected against errors, the error correction bits are again derived from the data bits and are compared with the read correction bits. The error bits are corrected on the basis of the compare result.

The storage elements required for storing the error correction bits and the error correction circuit entail substantial additional means. Apart from this, the time necessary for error detection and correction is directly added to the storage access time, so increasing the latter.

It is one object of the invention to provide a method of operating a storage containing defective storage elements for program-controlled data processors, which eliminates the disadvantages mentioned. The method in accordance with the invention is characterized in that for error detection a word to be stored is read back immediately after having been stored, is inverted in the case of an error indication, marked as an inverted word and stored in this form, and that the word so stored when being read later to retrieve the correct information supplied is again inverted.

The present invention provides a system for operating a storage for program-controlled electronic data processors even if this storage contains defective storage elements. Each storage location is capable of retaining both a word and a marking bit. An input means is coupled for placing a word to be stored in a storage location with error detection means reading the word immediately after it is stored and producing an error indication if the read word contains an error. Inverting means inverts the word as read in case of an error indication and produces a marking bit to mark the word as an inverted word. The inverted word and the marking bit are then returned to the same storage location. Output circuitry is arranged for inverting the marked inverted word during subsequent retrieval thereof.

The invention can be further characterised as a method of operating a storage for program-controlled electronic data processors wherein said storage might contain one or more defective storage elements. This method includes the steps of placing a word to be stored in the storage; reading the word immediately after it is stored and producing an error indication if the read word contains an error. Detection of an error is followed by the steps of inverting the read word, marking the word an an inverted word and placing the marked inverted word in storage. Finally, the marked inverted word is again inverted upon subsequent retrieval thereof. By use of the novel method in accordance with this invention the marked inverted word can be read immediately after it is stored. If a second error indication is produced reflecting that the read marked inverted word contains an error, the program of the data processor can then be interrupted.

The foregoing and other objects, features and advantages of the invention will be apparent from the following more particular description of the invention as illustrated in the accompanying drawings; wherein:

FIG. 1 shows a block schematic diagram of one illustrative embodiment of a circuit for applying the method in accordance with the invention;

FIGS. 2*a–d* are pulse diagrams for the circuit in accordance with FIG. 1.

In FIG. 1, the 1 refers to a storage with auxiliary circuits for reading and writing, which contains defective storage elements. A defective storage element is an element which, rather than storing both binary values zero and one, stores only one value. That is, storage 1 contains elements intended to retain a 0 or 1 but one or more of which has failed to operate so that either a 0 or a 1 is stored to the exclusion of the other regardless of the input bit value. This is a so-called "stuck bit" malfunction. The storage is addressed in a known manner by the address of a storage location to be selected being fed into storage register 2. The required storage location is selected via the X and Y decoders 3 and 4 connected to storage register 2. The storage 1 is operated so that the read and write cycles alternate (see FIG. 2*a*).

A word to be stored which is fed from a data source 5 to its register 6 is transferred to input terminals **10*a*, 10*b*, 10*c* and 10*d* via AND gates 7*b*, 7*d* and 7*f*, whose second inputs receive a control signal "data input", via OR gates 8*a*, 8*b* and 8*c* and Exclusive OR gates 9*a*, 9*b* and 9*c* forming an inverter unit 9. In addition, a word read from storage 1 and contained in storage data register 11 can be fed in inverted form to input terminals 10*a* to 10*d* of storage 1 via AND gates 7*a*, 7*c* and 7*c* upon application of a control signal "write back" to their second inputs, via OR gates 8*a*, 8*b* and 8*c* and Exclusive OR gates 9*a* to 9*c*** upon application of a control signal to their second inputs.

An error detection circuit 13 is connected to outputs **12*a* to 12*d* of storage 1. The set inputs of flip flops 14*a* to 14*d* forming storage data register 11 are directly linked with outputs 12*a* to 12*d* of storage 1 via AND gates 15*b*, 15*d*, 15*f* and 15*h* to whose second inputs clock pulses are applied. Via AND gates 15*a*, 15*c*, 15*e* and 15*g*, whose second inputs also receive clock pulses, and via inverters 16*a* to 16*d* the reset inputs of flip flops 14*a* to 14*d* are connected to the outputs 12*a* to 12*d* of storage 1. The outputs of inverter unit 9 are linked with a destination 18. Line 17, connected to the second inputs of Exclusive OR gates 9*a* to 9*c* forming the inverter unit 9, is also linked with storage input 10*f*** which accommodates the marking bit whose significance is hereafter described.

The output of error detection circuit 13 is connected to an AND gate 19 whose second input receives a signal for reading back the data previously stored. The output of AND gate 19 is linked, via AND gate **20*a*, with the set input of an "inversion" flip flop 21 on the one hand and, via an inverter 22 and an AND gate 20***b* with the reset input of said flip flop on the other. Clock pulses are applied to the second inputs of AND gates 20*a* and 20*b*. The only output used of the inversion flip flop 21 is linked with the first input of an AND gate 23*b* whose second input receives the signal write back when further data are to be stored. In addition, the output of the inversion flip flop 21 is connected to the first input of a further ANND gate 25 whose second input is linked with the output of the "marking" flip flop 14*d* for the marking bit of storage data register 11. The output of AND gate 23*b* is connected to an OR gate 24 whose output is linked with line 17. The second input of OR gate 24 is linked with the output of an AND gate 23*a* whose first input receives the signal "read" and whose second input is connected to the output of marking flip flop 14*d* of storage data register 11, which accommodates the marking bit.

The data words to be stored include in a known manner a parity bit which is also stored. In addition, each storage location of storage 1 comprises an additional bit position which is referred to as marking position. This position serves to accommodate a marking bit which indicates whether the word was stored in inverted form or not.

The method in accordance with this embodiment of the invention uses the following steps.

The bits of a word to be stored which are supplied by a data source 5 are fed upon application of the control signal data input to the addressed storage location via AND gates 7*b*, 7*d* and 7*f*. The binary value one shall be represented, for example, by an existing potential, whereas a missing potential shall be indicative of the binary value zero. Subsequently, (see FIG. 2*a*) the stored data word is read back for control purposes and is fed to circuit 13 for error detection. In cases in which not more than one bit storage position is defective, as is assumed for the storage of the embodiment, a simple parity check can be used for error detection. However, if more than one bit position is defective per storage location, a compare circuit is provided in place of the parity check circuit, by means of which the read word is compared with the word supplied by the data source and temporarily stored in its register. If circuit 13 for error detection detects no error, the storage process of the word is terminated, since monolithic storages permit non-destructive reading, thus eliminating the writing back of the read word.

If error detection circuit 13 detects an error, its output pulse is fed to an AND gate 19. The latter generates an output pulse when the control signal "read back" is available on its other input. The output pulse sets inversion flip flop 21 via AND gate 20*a* upon application of a clock pulse to its second input (see FIG. 2*b*). The output of inversion flip flop 21 connected to AND gate 23*b* subsequently has a high potential. When during the succeeding write cycle the signal write back (see FIG. 2*b*) is applied to the second input of AND gate 23*b*, the latter supplies an output pulse which is fed to the first inputs of Exclusive OR gates 9*a* to 9*c* of inverter unit 9 via OR gate 24 and line 17. The bits of the read word fed to the second inputs of inverter unit 9 via AND gates 7*a*, 7*c* and 7*e*, whose second inputs receive a control signal write back, are inverted and are transferred in this form to inputs 10*a* to 10 *c* of storage 1 where they are stored in the addressed storage location. The bit storage position for the marking bit provided for this storage loation receives the output signal of OR gate 24. Subsequently, the word stored in inverted form is read back for control purposes and is fed to error detection circuit 13. If no error is detected, the write cycle is terminated.

Figure 2A:
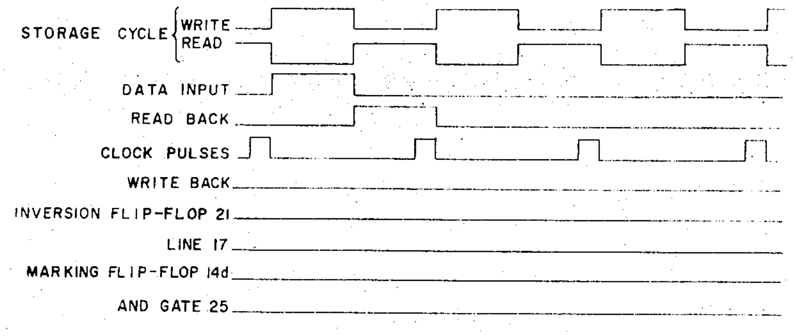
Figure 2B:
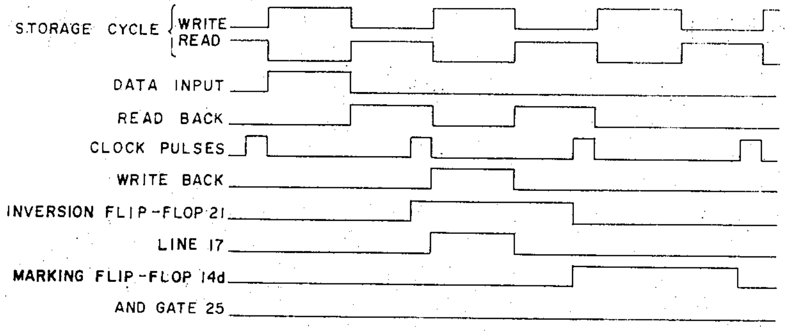
Figure 2C:
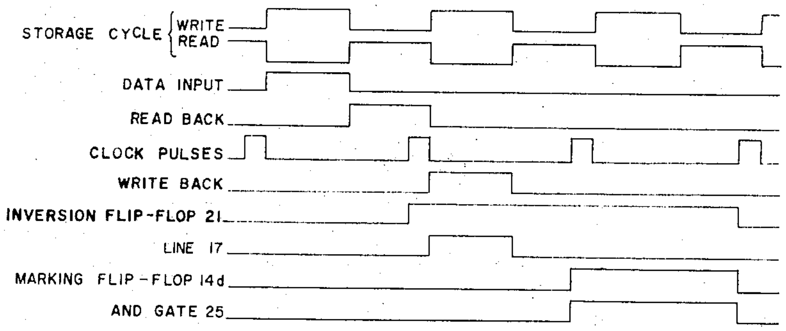

If an error is detected when the word stored in inverted form is read back, the data processor is stopped by the output signal of AND gate 25 (see FIG. 2*c*). This AND gate receives its firt input signal from inversion flip flop 21 which is set by the output signal of error detection circuit 13. The second input signal for AND gate 25 is supplied by marking flip flop 14*d* of storage data register 11, which subsequently emits a ONE output signal, since the read word was inverted after the first read back operation and identified as such.

Figure 2D:
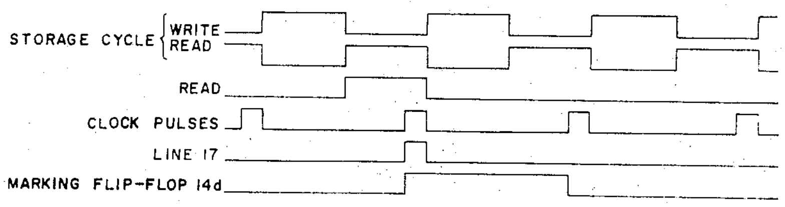

When a data word stored in inverted form is read later on, this word must again be inverted to receive the correct information as is supplied by the data source (see FIG.2*d*). To this end, the contents of the addressed storage location are transferred as during read back to storage data register 11 as soon as a clock pulse is applied to AND gates 15*a* to 15*h*. As the word thus read was stored in inverted form, AND gate 23*a* receives a ONE input signal from marking flip flop 14*d* of storage data register 11. As the signal read is also applied to the second input of AND gate 23*a*, the latter supplies an output signal which is fed to the second inputs of Exclusive OR gates 9*a* to 9*c* of inverter unit 9 via OR gate 24. The bits fed to the first inputs of Exclusive OR gates 9*a* to 9*c* are thus again inverted, so that the contents of the addressed storage location are again available in the form as supplied by data source 5 and are transferred to destination 18 from the outputs of inverter unit 9.

If the word was not inverted during storage, AND gate 23*a* receives a zero signal from marking flip flop 14*d* of storage data register 11, which does not fulfil the AND condition. Thus, an inversion control signal from OR gate 24 is not applied to the second inputs of Exclusive OR circuits 9*a* to 9*c* of inverter unit 9. The word fed to inverter unit 9 is fed unchanged from its output to destination 18.

As will be understood by those skilled in the art, the method in accordance with the invention is not confined to monolithic storages but may also be applied to other storage types.

The embodiments of the invention in which an exclusive property or privilege is claimed are defined as follows:

1. A method of operating a storage for program-controlled electronic data processors, said storage containing defective storage elements, comprising the steps of:

placing a word to be stored in the storage;

reading the word immediately after it is stored and producing an error indication if the read word contains an error;

inverting the read word in case of an error indication and marking the word as an inverted word;

placing the marked inverted word in storage;

inverting the marked inverted word during subsequent retrieval thereof.

2. A method according to claim 1, comprising the steps of:

reading the marked inverted word immediately after it is stored and producing a second error indication if the read marked inverter word contains an error; and interrupting the program of the data processor in case of a second error indication.

3. A method according to claim 1 wherein each word is examined for single bit errors by means of a parity check.

4. A system for operating a storage for program-controlled electronic data processors, said storage containing defective storage elements, each storage element being operable to store both a word and a marking bit, comprising:

input mean for placing a word to be stored in a storage element of the storage;

means coupled to said storage for reading the word immediately after it is stored;

means operable concurrently with said reading means for producing an error indication if the read word contains an error;

inverting means responsive to said error indication for inverting the word read by said reading means and for producing a marking bit to mark the word as an inverted word;

means for placing the inverted word and the marking bit in said storage element:

means operable in the absence of a said error indication for replacing the word read by said error detection means in said storage element without modification of said word, and output means responsive to said marking bit for inverting the marked inverted word during subsequent retrieval thereof.

* * * * *